United States Patent [19]
Dehnert

[11] 3,900,460
[45] Aug. 19, 1975

[54] WATER-SOLUBLE DISAZO COMPOUNDS CONTAINING A PYRAZOLE COMPONENT

[75] Inventor: Johannes Dehnert, Ludwigshafen, Germany

[73] Assignee: Badische Anilin- & Soda-Fabrik Aktiengesellschaft, Ludwigshafen (Rhine), Germany

[22] Filed: Feb. 20, 1973

[21] Appl. No.: 333,783

[30] Foreign Application Priority Data
Feb. 26, 1972 Germany............................ 2209255

[52] U.S. Cl. ............... 260/160; 260/153; 260/154; 260/158; 260/176; 260/194; 260/197; 260/200; 260/205; 260/206
[51] Int. Cl...... C09b 43/00; D06p 1/06; D06p 1/38
[58] Field of Search .......... 260/160, 161, 159, 153, 260/154

[56] References Cited
UNITED STATES PATENTS

| | | | |
|---|---|---|---|
| 1,706,878 | 3/1929 | Geller | 260/160 |
| 1,828,599 | 10/1931 | de Montmollin et al. | 260/160 |
| 3,037,974 | 6/1962 | Kracker et al. | 260/160 |
| 3,158,597 | 11/1964 | Blass et al. | 260/160 X |
| 3,234,206 | 2/1966 | Liechti | 260/160 X |
| 3,449,317 | 6/1969 | de Montmollin | 260/161 |
| 3,462,409 | 8/1969 | Meininger | 260/160 X |
| 3,549,612 | 12/1970 | Clarke | 260/160 |
| 3,663,528 | 5/1972 | Ramanathan | 260/160 |
| 3,663,530 | 5/1972 | Leroy et al. | 260/160 |
| 3,755,290 | 8/1973 | de Montmollin et al. | 260/161 |

OTHER PUBLICATIONS

Behr et al., "Pyrazoles, Pyrazolines, Pyrazolidines, Indazoles and Condensed Rings," Interscience Publishers, New York, 1967, Pages 10–16.

Fierz-David et al., Fundamental Processes of Dye Chemistry, Intersciences Publishers, New York, 1949, Pages 82–85.

*Primary Examiner*—Floyd D. Higel
*Assistant Examiner*—C. F. Warren
*Attorney, Agent, or Firm*—Johnston, Keil, Thompson & Shurtleff

[57] ABSTRACT

Water-soluble disazo dyes of the pyrazole series of the formula

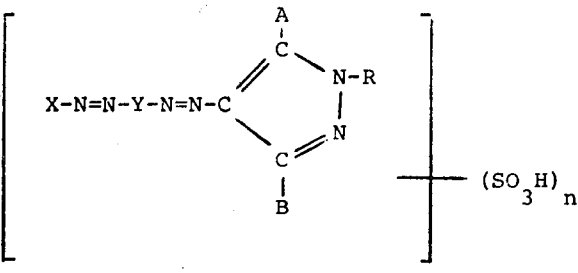

A and B each being hydrogen, methyl or phenyl; X being a phenyl or naphthyl radical; Y being a divalent phenylene or naphthylene radical; R being hydrogen or an organic radical; and $n$ being 1 or 2. The dyes are especially suitable for dyeing and printing natural and synthetic polyamides and basified textile material and also for dyeing cellulose fibers, particularly when they contain reactive radicals.

3 Claims, No Drawings

WATER-SOLUBLE DISAZO COMPOUNDS CONTAINING A PYRAZOLE COMPONENT

The invention relates to new disazopyrazole dyes of the general formula (I):—

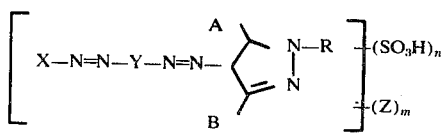

in which
A is hydrogen, methyl or phenyl;
B is hydrogen, methyl or phenyl;
X is a benzene or naphthalene ring which may bear chloro, bromo, methyl, methoxy, ethoxy, nitro and/or sulfamyl as single to triple substituents;
Y is a benzene or naphthalene ring attached in the 1,4-position to the azo bridges and which may bear chloro, bromo, methyl, methoxy, ethoxy, nitro and/or sulfamyl as single to triple substituents;
R is hydrogen or an unsubstituted or substituted aliphatic, cycloaliphatic, aromatic or araliphatic radical;
Z is a fiber-active radical;
$m$ is zero or 1; and
$n$ is 1, 2, 3 or 4.

X and Y may bear from one to three of the substituents chloro, bromo, methyl, methoxy, ethoxy, nitro and/or sulfamyl and each may also bear one or more sulfo groups and a fiber-active radical Z, the total number of substituents for each of X and Y not as a rule being more than 3.

Methyl groups are particularly preferred for A and B.

The substituent R on the pyrazole ring is hydrogen or an unsubstituted or substituted aliphatic, cycloaliphatic, aromatic or araliphatic radical. Examples of substituents for R are: hydroxy, cyano, amino, chloro, sulfo and nitro. R may also bear a fiber-active radical Z as a substituent. Examples of radicals R are: alkyl of one to seven carbon atoms, hydroxyalkyl of two or three carbon atoms, aminoalkyl of two or three carbon atoms, cyanoalkyl of two or three carbon atoms or phenyl or phenyl bearing chloro, nitro, cyano, amino or alkyl as a substituent. Specific examples are methyl, ethyl, propyl, butyl, cyclohexyl, hydroxyethyl, aminoethyl, cyanoethyl, phenyl and benzyl.

Examples of fiber-active radicals Z which the entire molecule of the formula (I) may bear once are:
—CO—CH=CH$_2$, —CO—CBr=CH$_2$, —CO—CH$_2$—Cl, —CO—CH$_2$—CH$_2$—Cl,

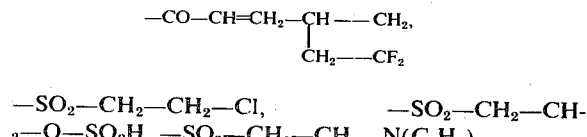

—SO$_2$—CH$_2$—CH$_2$—Cl,    —SO$_2$—CH$_2$—CH$_2$—O—SO$_3$H, —SO$_2$—CH$_2$—CH$_2$—N(C$_2$H$_5$)$_2$,

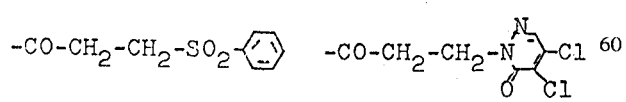

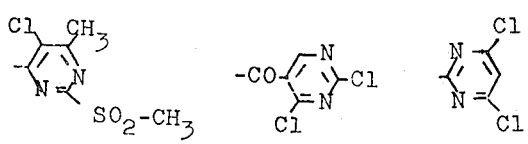

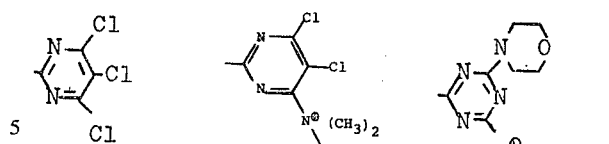

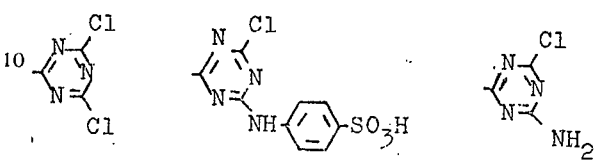

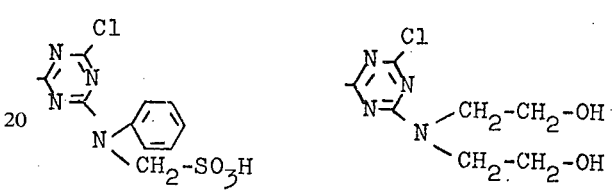

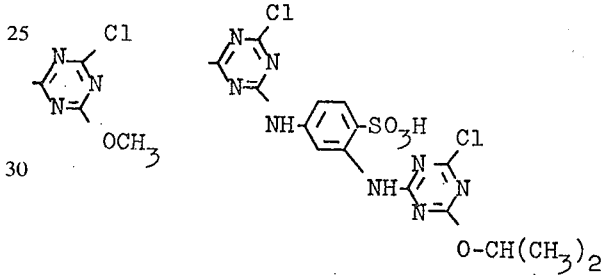

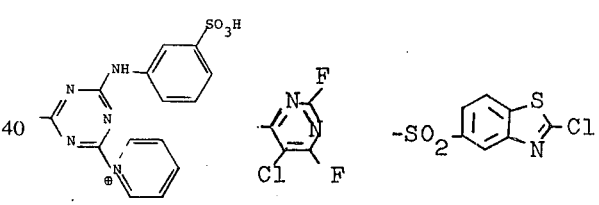

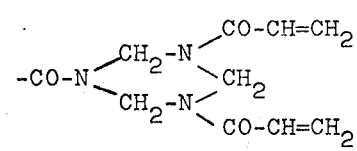

The number of sulfonic acid groups ($n$) in the whole molecule of formula (I) is 1, 2, 3 or 4. They may be located on the rings X or Y or in the substituents A, B, R or Z.

The new dyes of formula (I) may be prepared for example by coupling a diazo compound of an amine of the formula: X—N=N—Y—NH$_2$ with a coupling component of the formula:

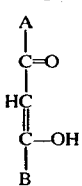

and reacting the product of the formula:

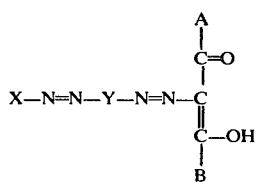

with a hydrazine of the formula:

$$H_2N\text{—}NH\text{—}R$$

and if desired introducing the radical Z. X, Y, A, B, R and Z have the meanings given above. All the reactions may be carried out by conventional methods. The sulfonic acid group may be already present as a substituent in the reactants. In cases in which the dye molecule is easily sulfonatable in the aromatic nuclei the sulfo group may be introduced into the finished disazo dye, the starting compound then being:

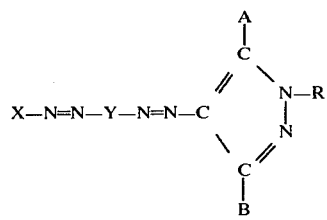

It is also possible to introduce the $SO_3H$- group into the molecule by esterifying with sulfuric acid an aliphatic hydroxyl group already present in the molecule.

The fiber-active radicals in the new dyes are reactive groups which enable the dye to combine chemically with the substrate, preferably cellulose. These radicals may be introduced into the molecule by a conventional method for example by reacting the dye by way of an amino or sulfamoyl group or another function capable of reacting with a reactive polyfunctional compound such as hexahydro-1,3,5-triacryloxy-S-triazine or cyanuryl chloride or a derivative thereof.

When the synthesis of the dyes is carried out in one of the ways described above with a 1,3-dicarbonyl compound as the coupling component, one of the following compounds is conveniently used as the 1,3-dicarbonyl compound: malonodialdehyde, acetoacetaldehyde, acetylacetone, formylacetophenone, benzoylacetone, dibenzoylmethane or a derivative of these compounds such as dimethylaminoacrolein or 4-diethylaminobutenone-2 in which case after coupling is complete the coupling product is present in the form of the 1,3-dicarbonylazo dye.

The new disazopyrazole dyes are particularly suitable for dyeing and printing natural and synthetic polyamides, wool, leather and all types of basified textile material by conventional methods.

Dyes with reactive groups are especially suitable for dyeing cellulosic material. The reactive groups may however also be introduced during dyeing. Triacryloformal for example is suitable for this purpose. Dyes according to the invention and provided with reactive groups give full dyeings having excellent fastness properties on textile materials preferably containing cellulose.

The following Examples illustrate the substances of the invention, their production and their use in detail. The parts and percentages set out are by weight. Parts by volume bear the same relation to parts by weight as the liter to the kilogram.

EXAMPLE 1

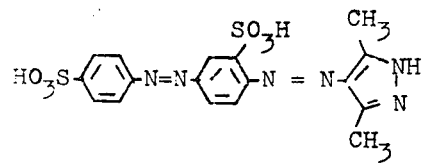

A solution of 357 parts of the disodium salt of 4-aminoazobenzene-3,4'-disulfonic acid in 1500 parts of water at 40°C has 300 parts by volume of 23% sodium nitrite solution added to it and is allowed to flow over one hour into a mixture of 250 parts by volume of 10N hydrochloric acid and 1000 parts of ice, the whole is stirred for 2 hours at 0° to 5°C and the excess nitrous acid is destroyed with a little sulfamic acid.

The diazotization mixture thus prepared has added to it at 0° to 5°C 110 parts of acetylacetone and then in portions 150 parts of anhydrous sodium acetate until a pH of 4.0 to 4.5 has been reached, a clear dye solution thus being obtained.

After coupling is over the dye solution is adjusted to pH 7 to 9 by adding 80 parts by volume of 50% caustic soda solution and then 89 parts of dihydrazine sulfate is added. 40 parts by volume of 50% caustic soda solution is added in the course of one hour. After stirring for several hours at room temperature the condensation is over and the dye partly precipitated. To complete precipitation 1000 parts of sodium chloride is added and the whole is stirred for another hour and suction filtered. After drying at 80°C in vacuo an orange yellow powder is obtained which dissolves in water with a yellow color.

Light fast yellow dyeings having good wet fastness properties are obtained on wollen cloth from a sulfuric acid liquor and on polycaprolactam from an acetic acid liquor.

Dyes having similar fastness properties are obtained in an analogous way using equivalent amounts of the aminoazobenzenes or aminoazonaphthalenes given in the following Table. They are also suitable for dyeing cotton by the process of Example 12.

| Example | Diazo component | Shade of dyeing on polycaprolactam or cotton |
|---|---|---|
| 2 | 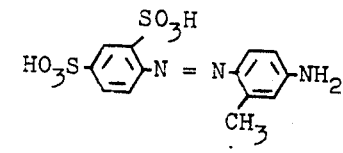 | yellow |
| 3 | 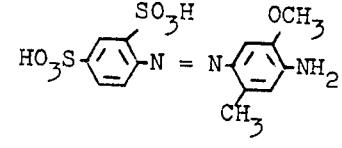 | orange |
| 4 | 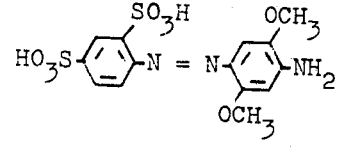 | reddish orange |
| 5 | 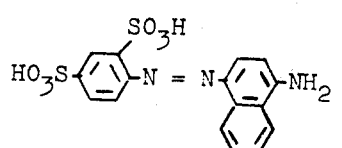 | orange |
| 6 | 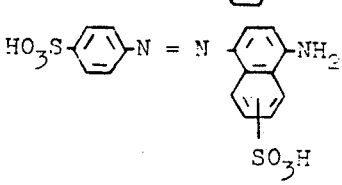 | orange |
| 7 | 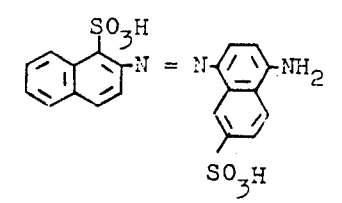 | reddish orange |
| 8 | 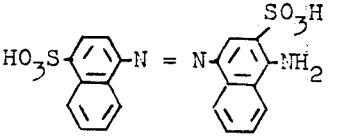 | yellowish red |
| 9 | 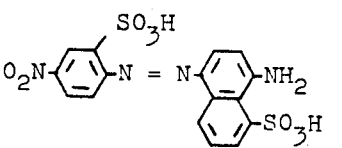 | orange |
| 10 | 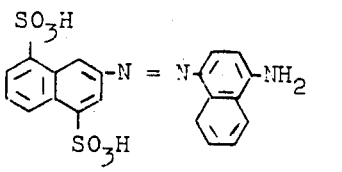 | yellowish red |
| 11 | 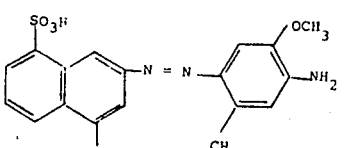 | orange |

EXAMPLE 12

20 parts of the dye powder of Example 1, 30 parts of sodium hydrogen carbonate, 15 parts of hexahydro-1,3,5-triacryloyl-S-triazine, 3 parts of polyvinyl alcohol and 12 parts of the condensation product from formaldehyde and naphthalene-2-sulfonic acid are mixed with 100 parts of urea, 420 parts of water and 400 parts of sodium alginate thickening (which contains 40 parts of alginate dry substance in 1000 parts of water). Cotton cloth is printed with the resultant print paste, dried and then steamed for about 5 to 8 minutes at 100°C. The printed material is then rinsed and soaped as usual. Yellow prints having very good light and wet fastness properties are obtained.

EXAMPLE 13

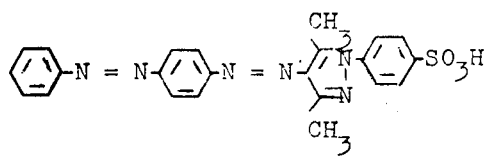

30 parts by volume of 23% sodium nitrite solution is gradually added to a mixture of 20 parts of finely divided 4-aminoazobenzene in 40 parts of concentrated hydrochloric acid, 400 parts of water and 200 parts of ice and the whole is stirred for two hours at +10°C. Excess nitrous acid in the filtered diazo solution is removed in the usual way. 11 parts of acetylacetone is then added all at once and then 55% sodium acetate solution is added at 10° to 15°C until a pH of 4 to 5 is reached. The yellow coupling product which is sparingly soluble in water is suction filtered and washed with water. This paste has 600 parts of pyridine, 150 parts of water and 40 parts of phenylhydrazine-4-sulfonic acid added to it and is then stirred at 70° to 80°C until complete reaction has been achieved, this being detected chromatographically. The reaction mixture is introduced into 600 parts of water and the dye is precipitated by adding 200 parts of sodium chloride. The dye is isolated and dried. It is a yellowish brown powder which dissolves in water with a yellow color and gives yellow dyeings having excellent fastness properties on polycaprolactam and on wool.

EXAMPLE 14

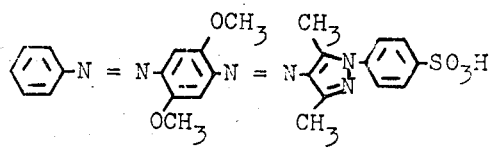

The 4-aminoazobenzene used as diazo component in Example 13 is replaced by 26 parts of 4-amino-2,5-dimethoxybenzene and the procedure of Example 13 is repeated. A red dye is obtained whose aqueous solutions give yellowish red dyeings with good fastness properties on polyamide fibers.

EXAMPLE 15

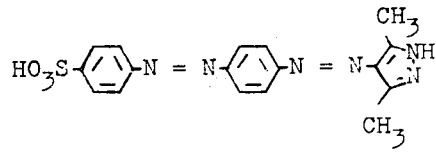

A mixture of 30 parts by volume of a 23% solution of sodium nitrite and a solution of 32 parts of the sodium salt of 4'-aminoazobenzene-4-sulfonic acid in 500 parts of water is allowed to flow gradually at 10° to 15°C into a mixture of 40 parts of 10N hydrochloric acid, 100 parts of ice and 200 parts of water. After stirring for two hours at 10° to 15°C the excess is destroyed with sulfamic acid as usual.

11 parts of acetylacetone is gradually introduced into the diazotization mixture and then 50% sodium acetate solution is added until a pH of from 4.5 to 5 is reached. After the coupling is over the coupling product is suction filtered and washed with a little water. The moist paste of the coupling product is stirred with 1500 parts of water and after 10 parts of hydrazine hydrate has been added the whole is stirred at room temperature until starting product is no longer detectable. The dye is precipitated from the deep yellowish red solution by adding 80 parts of sodium chloride, suction filtered and washed with a little water and dried at 80°C. An orange red powder is obtained which dissolves in hot water with a yellowish red color. Golden yellow dyeings having outstanding light fastness and good wet fastness properties are obtained with the dye on fibers or cloth of polyamide or wool.

By following the above procedure but using the equivalent amounts of the aminoazobenzenes or aminoazonaphthalenes specified in the following Table as diazo components, dyes of similar tinctorial properties and the specified shades are obtained.

| Example | Diazo component | Shade of dyeing on polycaprolactam |
|---|---|---|
| 16 | ⟨⟩-N=N-⟨⟩-NH₂ | yellow |
| 17 | HO₃S-⟨⟩-N=N-⟨⟩(CH₃)-NH₂ | reddish yellow |
| 18 | ⟨⟩(HO₃S)-N=N-⟨⟩(CH₃/CH₃)-NH₂ | reddish yellow |

| Example | Diazo component | Shade of dyeing on polycaprolactam |
|---|---|---|
| 19 | 3-HO₃S-C₆H₄-N=N-(2-OCH₃, 4-NH₂, 5-CH₃)-C₆H₂ | yellowish orange |
| 20 | 3-HO₃S-C₆H₄-N=N-(2-OCH₃, 4-NH₂, 6-OCH₃)-C₆H₂ | yellowish red |
| 21 | 4-HO₃S-C₆H₄-N=N-(2-OCH₃, 4-NH₂, 6-OCH₃)-C₆H₂ | yellowish red |
| 22 | (4-CH₃O, 2-SO₃H)-C₆H₃-N=N-(2-OCH₃, 4-NH₂, 6-OCH₃)-C₆H₂ | yellowish red |
| 23 | 3-HO₃S-C₆H₄-N=N-(5-amino-naphth-1-yl) | reddish orange |
| 24 | C₆H₅-N=N-(5-amino-7-sulfo-naphth-1-yl) | orange |
| 25 | 4-HO₃S-C₆H₄-N=N-(2-Br, 4-NH₂, 6-Br)-C₆H₂ | yellow |
| 26 | (8-sulfo-naphth-2-yl)-N=N-(2-OCH₃, 4-NH₂, 6-OCH₃)-C₆H₂ | reddish orange |
| 27 | (5-sulfo-naphth-2-yl)-N=N-(5-amino-naphth-1-yl) | reddish orange |
| 28 | (4-O₂N, 2-SO₃H)-C₆H₃-N=N-(2-OCH₃, 4-NH₂, 6-OCH₃)-C₆H₂ | orange |
| 29 | (4-HO₃S, 2-Cl, 6-Cl)-C₆H₂-N=N-C₆H₄-NH₂ | yellow |
| 30 | 4-HO₃S-naphth-1-yl-N=N-(4-amino-naphth-1-yl) | reddish orange |
| 31 | 4-O₂N-C₆H₄-N=N-(4-amino-7-sulfo-naphth-1-yl) | orange |

EXAMPLE 32

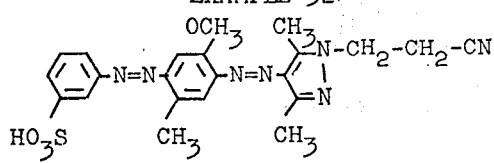

0.1 mole of the coupling product of 4-amino-2-methyl-5-methoxyazobenzene-3'-sulfonic acid and acetylacetone obtained analogously to Example 15 is stirred as a moist paste with 1000 parts of water and adjusted to pH with caustic soda solution. Then 15 parts of cyanoethylhydrazine is added and the whole is heated to 50°C. After reaction is completed the dye is precipitated by adding saturated sodium chloride solution, suction filtered, washed with a little water and dried. The ocher colored powder dissolves in hot water giving a reddish yellow color. Yellowish orange dyeings with excellent fastness properties are obtained therewith on polycaprolactom or woolen cloth.

The following dyes are obtained in a similar manner:

The coupling product of Example 15, paragraph 2, is stirred at 60°C with 500 parts by volume of pyridine. Into the solution thus obtained there is introduced gradually a mixture of 17 parts of phenyl hydrazine and 50 parts by volume of pyridine and the reaction mixture is kept at 60°C while stirring until complete reaction has taken place. This may easily be determined by thin layer chromatography. After cooling the reaction mixture is diluted with 5000 parts of water and the dye is precipitated by adding 300 parts of sodium chloride. The isolated and dried dye (a yellowish brown powder) dissolves in hot water with a reddish yellow color and dyes wool or polyamide fibers reddish yellow shades having very good fastness properties.

EXAMPLE 40

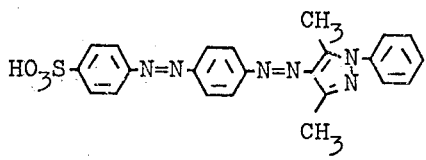

| Example | Dye | Shade of dyeing on polycaprolactam |
|---|---|---|
| 33 | | yellow |
| 34 | | yellow |
| 35 | | reddish yellow |
| 36 | | reddish orange |
| 37 | | orange |
| 38 | | orange |
| 39 | | orange |

EXAMPLE 41

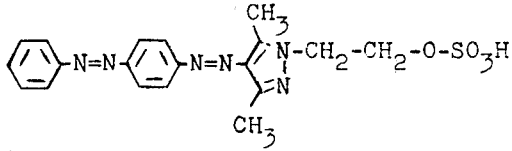

11 parts of acetylacetone is added at 5° to 10°C to the solution of the diazonium salt from 20 parts of 4-aminoazobenzene obtained in the usual way and then saturated sodium acetate solution is added gradually until a pH of 5 has been reached. The coupling product is suction filtered and washed with water. The powder obtained after drying is boiled with 5000 parts by volume of ethanol while stirring. A mixture of 10 parts of 2-hydroxyethylhydrazine and 20 parts by volume of ethanol is slowly added and the whole is kept for about 2 hours under refluxing conditions until starting dye can no longer be detected chromatographically.

After cooling the reaction product of the formula:

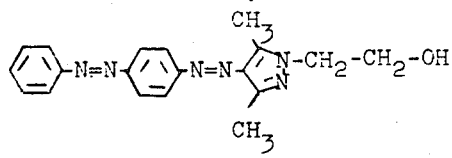

is suction filtered, washed with alcohol and dried.

The whole of the pyrazole derivative thus obtained is introduced in small portions into 200 parts of 100% sulfuric acid while stirring so that the temperature of 40°C is not exceeded. Toward the end the whole is stirred for some time at 50°C until starting product is no longer to be detected. The reaction mixture is then introduced into 1500 parts of a mixture of ice and water and the dye is isolated by suction filtration and washing with water. For conversion into the sodium salt the moist paste is suspended in 2000 parts of water and 400 parts by volume of 55% sodium acetate solution is introduced. After stirring for several hours the sodium salt of the dye sulfuric acid ester is suction filtered, washed with a little water and dried at 80°C. The orange yellow powder dissolves in hot water with a yellow color and gives yellow dyeings having excellent fastness properties on polycaprolactam or woolen cloth.

EXAMPLE 42

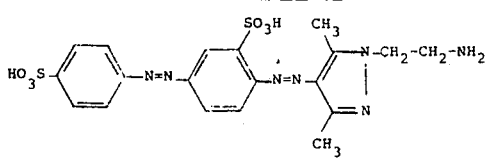

One tenth of the coupling solution obtained according to Example 1, paragraph 2 is adjusted to pH 7.5 with 50% caustic soda solution and at room temperature 12 parts of 2-aminoethylhydrazine is added. The whole is stirred for several hours until starting product is no longer detectable and the dye is then precipitated by adding 100 parts by volume of 10N hydrochloric acid and 100 parts of potassium chloride, suction filtered and washed with a little water and dried. The water-soluble yellow powder obtained dyes polyamide fast reddish yellow shades.

EXAMPLE 43

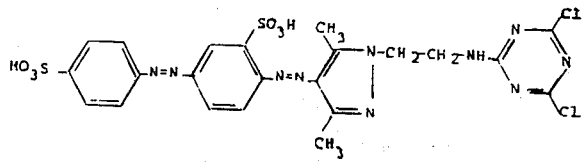

The solution of 26 parts of the dye obtained according to Example 42 in 200 parts of water which has been adjusted to pH 7 has gradually added to it at 0° to 5°C while stirring a solution of 10 parts of cyanuryl chloride in 150 parts by volume of acetone. A pH range of from 5 to 7 is maintained at the same time by adding sodium hydrogen carbonate. The reaction product is precipitated by adding 100 parts of potassium chloride, suction filtered, washed with dilute potassium chloride solution and dried in vacuo at 40°C. The yellow powder obtained, when dissolved in water, gives yellow shades of excellent fastness properties on cotton by the various methods conventionally used for reactive dyes.

EXAMPLE 44

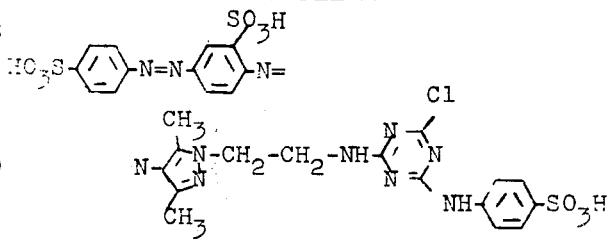

A solution of 26 parts of the dye of Example 42 prepared as described in Example 43 is stirred with a solution of 15 parts of the sodium salt of 1,3-dichloro-5-aminobenzenesulfonic acid triazine:

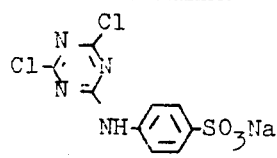

in 500 parts of water at room temperature. After 1 part of sodium carbonate has been added the whole is kept at 40°C until complete reaction has been achieved. The new dye is separated by adding 200 parts of sodium chloride. It is suction filtered and washed with a little water. The dried product dissolves readily in water and gives yellow shades having outstanding fastness properties on cellulosic fabrics by dyeing and printing methods conventionally used for reactive dyes.

EXAMPLE 45

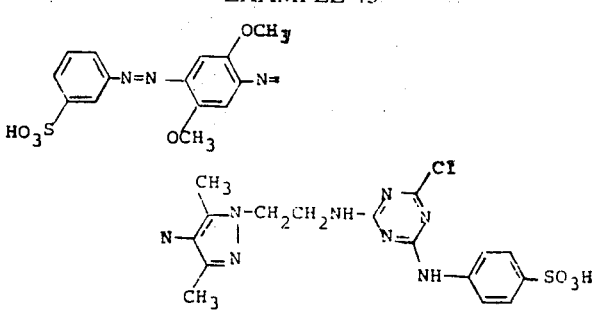

34 parts of 4-amino-2,5-dimethoxyazobenzene-3'-sulfonic acid is diazotized as described in Example 15, paragraphs 1 and 2 and coupled with 11 parts of acetylacetone. The dye paste obtained after isolation is dissolved in water at 50°C with an addition of caustic soda solution to bring the pH to 7.5. Then 12 parts of 2-aminoethylhydrazine is added and the whole is stirred at 50°C until reaction is completed. The reaction product is substantially precipitated by adding 500 parts of sodium chloride and it is then suction filtered and washed with a little water. The brownish powder obtainable after conversion analogous to Example 44 dissolves in water with a yellowish red color. Fast reddish orange shades are obtained on cotton by the more important conventional reactive dyeing methods.

EXAMPLE 46

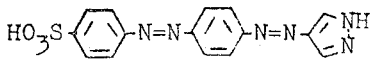

The diazotization mixture obtained as described in Example 15 from 32 parts of the sodium salt of 4′-aminoazobenzene-4-sulfonic acid has 14 parts of 3-diethylaminopropenal-(1) added to it at from 5° to 10°C. Coupling is over after stirring for several hours. The coupling product is suction filtered and washed with water. The paste thus obtained is stirred with 2000 parts of water and adjusted to a pH of 7 with dilute caustic soda solution. After 10 parts of hydrazine hydrate has been added the whole is stirred at room temperature until complete reaction has been achieved. The new dye is precipitated from the solution thus obtained by adding 500 parts of sodium chloride. After suction filtration, washing with a little water and drying there is obtained a yellowish brown powder whose yellow aqueous solutions give fast reddish yellow shades on hexamethylenediamine adipate fibers.

EXAMPLE 47

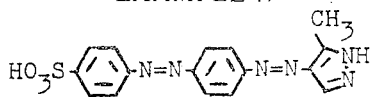

18 parts of 4-diethylaminobutenone-(2) is used instead of 3-diethylaminopropenal-(1) in Example 46 and the procedure of that Example is otherwise repeated. A yellowish brown dye powder is obtained which dissolves in water and gives fast reddish yellow dyeings on wool and synthetic polyamide.

EXAMPLE 48

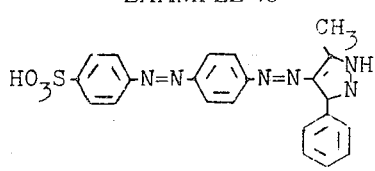

The diazotization mixture of Example 15 is allowed to flow gradually at 0° to 5°C into a solution of 18 parts of benzoylacetone in 1000 parts by volume of dimethylformamide. The reaction mixture then has slowly added to it 250 parts by volume of a 50% sodium acetate solution and, after coupling is over, 400 parts of sodium chloride.

The suction filtered and washed coupling product is stirred with 1500 parts of water and 10 parts of hydrazine hydrate at 50°C until the reaction is over. After dilution with 2000 parts of water and salting out with 100 g of sodium chloride the new dye is isolated by suction filtration and washed and dried. The orange yellow powder dissolves in hot water with a yellow color. The yellow dyeings obtained therewith on woolen or polycaprolactam textile materials have high light fastness and good wet fastness properties.

EXAMPLE 49

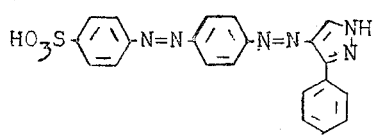

The procedure described in the preceding Example is repeated using 17 parts of formylacetophenone instead of benzoylacetone as coupling component. A reddish yellow dye is obtained having similar tinctorial properties.

EXAMPLE 50

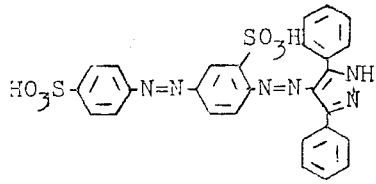

One tenth of the diazotization mixture prepared as described in Example 1 is allowed to flow gradually at 0° to 5°C into a solution of 25 parts of dibenzoylmethane in 1000 parts by volume of dimethylformamide. At the same time 100 parts by volume of 50% sodium acetate solution is added to the coupling mixture. After the coupling is over the dye is diluted with 2000 parts of water and precipitated by adding 500 parts by volume of saturated sodium chloride solution, washed with a little water and dried. The orange powder dissolves in water with a yellow color and gives light fast yellow orange dyeings having good wet fastness properties on polyamide or woolen cloth.

EXAMPLE 51

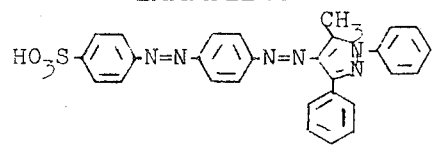

and

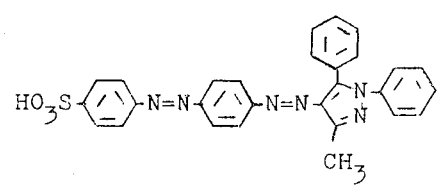

The coupling product with benzoylacetone obtainable according to Example 48, paragraph 1 is stirred as the isolated moist paste with 500 parts by volume of pyridine at 60°C. Then a mixture of 15 parts of phenyl hydrazine and 50 parts of pyridine is gradually added and the whole is kept at 60°C until starting dye is no longer detectable. 6000 parts of water and 300 parts of glacial acetic acid are added, followed by 1000 parts of sodium chloride to isolate the dye. The isolated and dried dye (a brown yellow powder) dissolves in hot water with a reddish yellow color. Polyamide or woolen threads are dyed therewith fast reddish yellow shades.

EXAMPLE 52

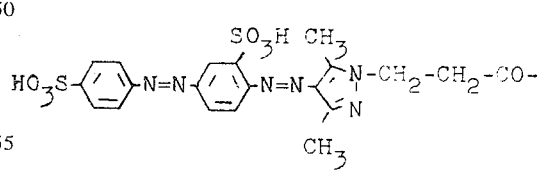

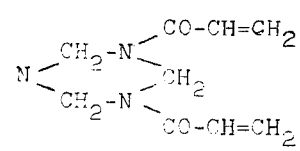

16 parts of the dye of Example 1 is intensely ground as a dry powder with 10 parts of hexahydro-1,3,5-triacryloyl-S-triazine in a vibrating mill in dry condition. An easily water-soluble yellow product is thus formed which is applied to cotton for example by the pad-steam method. Yellow dyeings having outstanding light and wet fastness properties are obtained. Fast yellow shades with excellent fastness properties are also obtained therewith on polyamide.

When the following compounds are used instead of the dye from Example 1 and the procedure of Example 52 is adopted, dyes having similar tinctorial properties are obtained.

with caustic soda solution, 12 parts of 2-hydroxyethylhydrazine is added and the whole is stirred at 40°C until complete reaction has been achieved. The dye is precipitated by adding saturated sodium chloride solution and heating to 90°C. After suction filtration, washing with a little water and drying, the dye is a brown yellow powder whose aqueous solutions give yellow dyeings having high light fastness and good wet fastness properties on polycaprolactam or woolen cloth.

| Example No. | Starting dye | Shade of dyeing on cotton |
|---|---|---|
| 53 | [structure] | yellow |
| 54 | [structure] | yellow |
| 55 | [structure] | reddish orange |
| 56 | [structure] | orange |
| 57 | [structure] | reddish yellow |
| 58 | [structure] | orange |
| 59 | [structure] | yellowish red |
| 60 | [structure] | orange |
| 61 | [structure] | orange |

EXAMPLE 62

The coupling product prepared as described in Example 15, paragraph 2 is suspended as a moist paste in 500 parts of water. The mixture is adjusted to pH 7.5

The following dyes, prepared analogously, have similar tinctorial properties:

| Example No. | Dye | Shade of dyeing on polycaprolactam |
|---|---|---|
| 63 | (structure) | yellow |
| 64 | (structure) | yellow |
| 65 | (structure) | yellow |
| 66 | (structure) | yellowish orange |
| 67 | (structure) | reddish orange |
| 68 | (structure) | orange |
| 69 | (structure) | orange |
| 70 | (structure) | reddish orange |

EXAMPLE 71

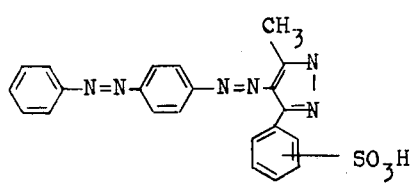

A diazonium salt solution obtained from 4-aminobenzene by a known method is allowed to flow at from 5° to 10°C into a solution of 17 parts of benzoylacetone in 1000 parts of dimethylformamide. At the same time a saturated solution of sodium acetate is added until a pH of 4.5 is reached. The coupling product thus obtained is suction filtered, washed with 1000 parts of 50% alcohol and then with hot water and dried at 80°C.

18 parts of the yellow powder thus obtained is introduced into 100 parts of sulfuric acid monohydrate while stirring at a maximum of 40°C. 86 parts of 65% oleum is added to the solution thus obtained and the whole is stirred at 25° to 30°C until complete sulfonation has taken place. The whole is discharged into 1000 parts of a mixture of ice and water and the free dye acid is isolated by suction filtration and washing with water. The product is stirred with 1000 parts of water and neutralized by adding a 10% solution of sodium carbonate so that the sodium salt of the dye which is sparingly soluble in cold water is formed. The dye is isolated and dried. It is a yellow powder which dissolves in hot water. The solution dyes polyhexamethylenediamine adipate cloth fast yellow shades.

EXAMPLE 72

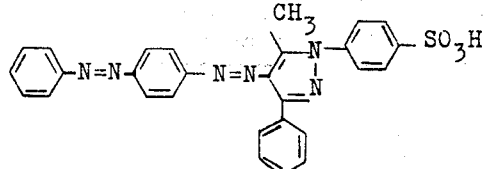

and

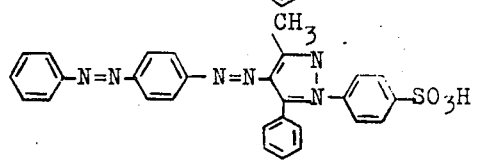

A solution of 4 parts of phenyl hydrazine-4-sulfonic acid in 10 parts of pyridine and 15 parts of water is gradually run at 60°C into a mixture of 50 parts of pyridine and 4 parts of the dried coupling product obtainable according to Example 71, paragraph 1. The reaction mixture is stirred at 60°C until complete reaction has been achieved. After cooling it is introduced into 1000 parts of water while stirring. The new dye is precipitated from the resulting solution by adding 40 parts of sodium chloride, suction filtered, washed with alcohol and dried. An orange powder is obtained whose aqueous solutions dye polycaprolactam cloth fast yellow shades.

EXAMPLE 73

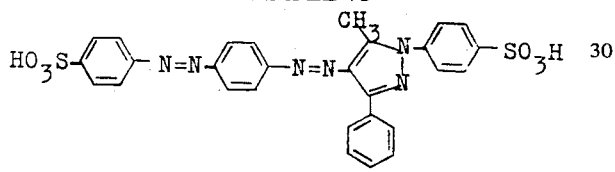

and

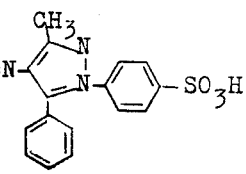

A solution of 8 parts of phenylhydrazine-4-sulfonic acid in 20 parts of pyridine and 30 parts of water is added gradually at 60°C to a mixture of one fifth of the paste of the coupling product prepared as described in Example 48, paragraph 1 and 100 parts of 75% pyridine. The whole is kept at 60°C while stirring until starting dye can no longer be detected. After introduction into 1000 parts of water and salting out with 150 parts of sodium chloride, the reaction product is isolated by suction filtration, washing with alcohol and drying at 80°C. The reddish yellow powder dissolves readily in water with a reddish yellow color and produces golden yellow dyeings having excellent fastness properties on polyamide fibers.

By following Example 43 but using the reactive components given below instead of the cyanuryl chloride component, yellow water-soluble reactive dyes are obtained which are outstandingly suitable for dyeing cellulosic textile material.

| Example | Dye | Reactive component |
|---|---|---|
| 74 | HO₃S—⟨⟩—N=N—⟨⟩(SO₃H)—N=N—[CH₃,CH₃ pyrazole]—N-CH₂-CH₂-NH₂ | triazine-Cl,Cl,NH₂ |
| 75 | " | " triazine-Cl,Cl,O-CH₃ |
| 76 | " | " triazine-Cl,Cl,N(CH₃)(Ph) |
| 77 | " | " triazine-Cl,Cl,N(Ph)(CH₂SO₃H) |
| 78 | " | " triazine-Cl,Cl,Cl |

CONTINUED

| Example | Dye | Reactive component |
|---|---|---|
| 79 | HO₃S—⟨⟩—N=N—⟨SO₃H⟩—N=N—[pyrazole with CH₃, CH₃, N-CH₂-CH₂-NH₂] | trichloropyrimidine |
| 80 | " | " (Cl, CH₃ pyrimidine with SO₂-CH₃) |
| 81 | " | " (chlorotriazinyl-NH-phenyl-SO₃H-NH-triazine with Cl and O-CH(CH₃)₂) |
| 82 | " | " $-CO-$ (dichloropyridazine) |
| 83 | " | " $-CO-$ (dichloroquinoxaline) |
| 84 | " | " $-CO-$ (dichlorophthalazine) |
| 85 | " | " $-CO-CH_2-CH_2-N$ (dichloropyrazolone) |
| 86 | " | " $-SO_2-$ (2-chlorobenzothiazole) |
| 87 | " | " $-CO-CH=CH_2$ |
| 88 | " | " $-CO-CH_2-CH_2-Cl$ |
| 89 | " | " $-CO-CH_2-Cl$ |
| 90 | " | " $-CO-CH_2-CH_2-SO_2-\langle\rangle$ |

The following dyes can be obtained analogously to Example 42:

| Example | Dye |
|---|---|
| 91 | [naphthalene-(SO₃H)₂]—N=N—[naphthalene-SO₃H]—N=N—[pyrazole with CH₃, CH₃, N-CH₂-CH₂-NH₂] |
| 92 | HO₃S—⟨⟩—N=N—[naphthalene-SO₃H]—N=N—[pyrazole with CH₃, CH₃, N-CH₂-CH₂-NH₂] |

| Example | Dye |
|---------|-----|
| 93 | 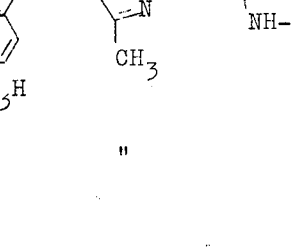 |
| 94 | 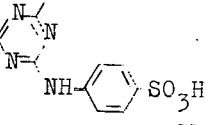 |
| 95 | 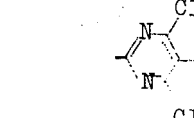 |

By introducing reactive radicals into dyes of the above Examples 91 to 95 products are obtainable which give orange dyeings having high fastness to light and wet treatments preferably on cellulosic textile material by conventional dyeing and printing methods:

| Example | Dye | R |
|---------|-----|---|
| 96 | 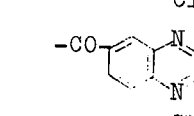 | 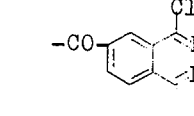 |
| 97 | '' | 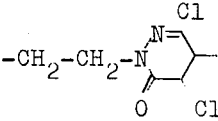 |
| 98 | | 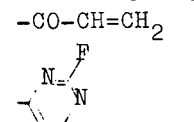 |
| 99 | '' | 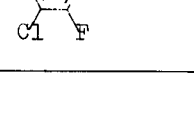 |
| 100 | '' | -CO-<image with quinoxaline Cl,Cl> |
| 101 | '' | -CO-<image with phthalazine Cl> |
| 102 | '' | -CO-CH$_2$-CH$_2$-N<pyridazinone Cl,Cl> |
| 103 | '' | -CO-CH=CH$_2$ |
| 104 | '' |  |

EXAMPLE 105

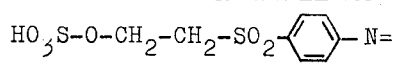
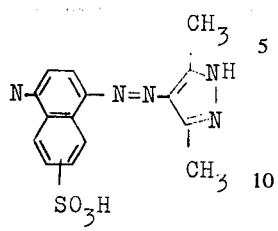

0.1 mole of the coupling product of the formula:

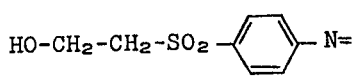
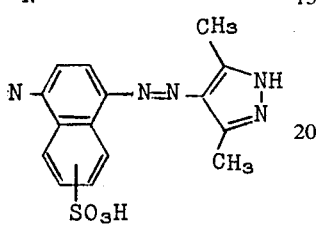

is reacted with hydrazine as described in Example 1. The isolated and dried reaction product is introduced into 250 parts of sulfuric acid monohydrate. After completion of the esterification at room temperature the whole is discharged onto ice-water and the reactive dye is isolated by suction filtration and dried. It dyes cotton fast yellowish orange shades.

I claim:

1. A water-soluble disazo dye of the formula

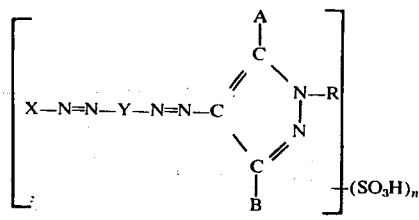

in which

A is hydrogen, methyl or phenyl;

B is hydrogen, methyl or phenyl;

X is phenyl; naphthyl; or phenyl substituted by chloro, bromo, methyl, methoxy, ethoxy, nitro or sulfamoyl;

Y is p-phenylene; p-phenylene substituted by chloro, bromo, methyl, methoxy or ethoxy; or 1,4-naphthylene;

R is hydrogen; alkyl of 1 to 7 carbon atoms; hydroxyalkyl of 2 or 3 carbon atoms; aminoalkyl of 2 or 3 carbon atoms; cyanoethyl; cyclohexyl; benzyl; phenyl; or phenyl substituted by chloro, nitro, cyano, amino or methyl; and $n$ is 1 or 2, the sulfo groups being bound to X, Y or R.

2. A dye as claimed in claim 1 wherein R is hydrogen, ethyl, hydroxyethyl, aminoethyl, cyanoethyl, phenyl, chlorophenyl, nitrophenyl, cyanophenyl, aminophenyl or methylphenyl.

3. A dye as claimed in claim 1 wherein A and B each represents methyl.

* * * * *